UNITED STATES PATENT OFFICE.

GEORGE RUDORF, OF LONDON, ENGLAND, ASSIGNOR TO THE PERMUTIT COMPANY, OF NEW YORK, N. Y., A CORPORATION OF DELAWARE.

PROCESS OF MAKING EXCHANGE SILICATES.

1,263,706.  Specification of Letters Patent.  Patented Apr. 23, 1918.

No Drawing.  Application filed December 9, 1916. Serial No. 136,057.

*To all whom it may concern:*

Be it known that I, GEORGE RUDORF, a citizen of the British Empire, residing at London, England, have invented certain new and useful Improvements in Processes of Making Exchange Silicates, of which the following is a specification.

This invention relates to processes of making exchange silicates; and it comprises a method of producing readily reactive exchange silicates wherein rocks or earthy materials containing acid-soluble silicates are first extracted with an acid and then with an alkali, the two solutions being then reunited and the precipitate produced being washed and dried; all as more fully hereinafter set forth and as claimed.

In the purification of water, the best method of softening now in use involves the use of what are known as exchange silicates; compositions containing alkali, silica, alumina and water in mutual combination. In use these materials in granulated form are formed into filter-like beds and the water to be purified is run through. An exchange takes place between the calcium and magnesium compounds of the water and the alkali of the silicate, the latter going into solution as harmless alkali compounds while lime and magnesia are fixed by and remain in the zeolite. After a sufficient period of use the exchange silicate is revivified by treatment with a solution of common salt (NaCl). Sodium now enters the silicate, while calcium and magnesium are given up to the salt solution as chlorids. After washing with water, the exchange silicate is again ready for use. In this manner of use a number of qualities or properties must be united in the exchange silicate. The material must possess a high degree of the exchange power; that is, must be chemically active; it must possess a high degree of perviousness so as to offer an extended area or surface for reaction; and it must exist in hard, rigid, angular, granular form, which it must not lose by erosion. The material in the filter bed must not mud down, slime or lose its shape under the burden of the material in the bed itself and the pressure of the water. The materials now in use are mainly prepared by fusion processes, a certain amount of alkali, alumina compounds and silicate compounds being melted together and the melt being subsequently granulated and hydrated. There are many natural materials which possess these exchange properties, such as trass, phonolite, lava, etc., in greater or less degree. In igneous rocks of various types, there is more or less hydrated material which has the exchange property. But in many of these rocks, and in many earthy materials derived from them by weathering, the total amount of material having exchange property which is ordinarily present is small. In a rock there may be a certain number of granules of material having the exchange property and many other granules not having a good exchange activity or having none whatever. In other words, the exchange material in the natural rocks and earths which are available is ordinarily too dilute; there is too much inert matter present. The material in the rocks and earths which does have exchange activity, however, often possesses it in a very high degree, a fact which is probably due to the complexity of these natural silicates which often contain very many bases in a minor amount. That is, a silicate in an igneous rock, or igneous rock derivative, like the various tufas, may be mainly a silicate of alumina but it usually contains a great variety of other bases and components in minor amounts and in traces. The catalytic or assisting activity of these minor components may be an explanation of the activity of some of these materials found in rocks and earth. Nevertheless with the majority of these natural materials a larger area of filter bed is required than is necessary with the highly active artificial exchange silicates now in use.

In the present invention I have devised a method of producing highly reactive exchange substances from these native materials in which I secure the advantage of their high reactivity, and as a matter of fact, enhance it while securing a more concentrated product.

The portions of the igneous rocks and their weathered products which are active in exchange reactions are also attacked by acids. They are hydrated materials, or if not hydrated in their natural state, they are generally materials which will readily hydrate; and they are readily attacked by acid. On the other hand, the inert components of these materials are not attacked by acid. In the present invention, therefore, I first treat the rock or earthy material with an acid and dissolve whatever I can. This acid is advantageously hydrochloric acid, although other acids may be employed. The acid is best used warm and rather dilute. A 10 per cent. solution of hydrochloric acid (HCl) is a good strength.

The action of the hydrochloric acid on the active components of the material is to dissolve the bases, such as iron, alumina, soda, potash, lime, magnesia, etc., and it also generally takes in a greater or less amount of the silica. After removing the acid extract, I wash the acid-treated rocky material with water. The washings may be added to the hydrochloric acid solution or may be rejected. This washing step is not absolutely necessary but it is better to wash out at least to some extent. The acid-treated, washed material is now treated with a solution of an alkali. Sodium carbonate may be used, or caustic soda. Advantageously, both are used, the extraction being performed by a solution of alkali carbonate, such as sodium carbonate, to which a small proportion of caustic soda has been added. This solution is best used hot in such an amount as will be about equivalent to the amount of acid originally used. The alkali is best used in a rather dilute solution, say, 10 per cent., or so. Extraction is best at a temperature around 100° C. and may be prolonged for several hours. When extraction is deemed substantially complete the soda solution is removed. It carries with it the silica which has been liberated by but not dissolved in the hydrochloric acid solution and also such other acid oxids as may be, and usually are, present in the reactive material, such as titanic oxid. The alkaline solution is now united with the acid extract. The soda combines with the hydrochloric acid and the extracted materials of both solutions are precipitated together as a more or less gelatinous colloid. The precipitate so obtained contains the various active materials of the reactive portions of the original rock or earth and may, in a way, be said to be a reconstitution of said reactive portions. It is however more concentrated and more reactive. If the soda used in the alkaline extraction be somewhat in excess, it is often advantageous since some of these natural reactive materials are somewhat deficient in alkali and by using the soda in some excess the precipitate is enriched in alkali.

This precipitate in the form in which it is produced is of course not applicable to water purification directly being generally gelatinous or pasty. It must first be converted into hard, permanent, rigid, angular granules. For this purpose, I next filter press the precipitate to produce a cake. I may, or may not, wash this cake more or less perfectly. Ordinarily, I do not wash it to any extent. The press cake is now carefully dried at a temperaure below 100° C. This drying may be effected in any of the ordinary commercial drying apparatus or machines. I prefer and find advantageous drying at about 70° to 90° C. After the greater part or all of the water present in what may be called the physical form of moisture, has been removed, the cake will present the aspect of a hard, horny mass. This hard, horny mass or cake on treatment with water will break up into small angular granules which, after drying and sizing, are ready for use. In the event that the filter cake was washed in the press, the dried cake may be broken up in any mechanical manner and thereafter treated with hot water.

With rocks and rocky materials where the silica of the silicates and the other acid constituents of the rock are readily soluble in the hydrochloric acid used for extraction, the second treatment of the rock with caustic alkali may be omitted, and the acid extract simply precipitated with a soda solution.

With some such rocks, the use of heat in making the acid extract is not necessary.

In a specific embodiment of my process 300 kilos of powdered trass are boiled in a mixture of 350 liters commercial hydrochloric acid mixed with 700 liters of water. The acid solution is then run off and the residue, after washing, is boiled with a solution of 200 kilos soda ash and 40 kilos caustic soda in 4000 liters of water.

This alkaline solution is then run off and diluted with a further 4000 liters of water and the acid solution slowly poured into it with constant stirring. The mixture is now warmed up to about 60° C. and then pumped into a filter press and converted into cakes by pressure.

The filter cakes are then dried at a temperature of about 70° C. and when dry they are thrown into water, which may be either hot or cold. In the water, the cakes disintegrate into hard angular grains or fragments. By suitable means, such as a centrifugal machine, the liquor is then removed from the fragments and these are ready for use.

In another embodiment of my process I take 20 parts of lava ground to about 20 mesh and boil with about 25 parts by weight of commercial hydrochloric acid diluted with about 50 parts of water. The extract is removed from the insoluble residue and the latter well washed, the washings being added to the extract. The residue is then boiled with a solution of 14.3 parts of soda ash and 2.2 parts of commercial caustic soda. The alkaline extract is then added to the acid extract and the precipitate treated as in the former instance.

The acid extract can of course receive additions of sulfate of alumina or the like, or the alkaline extract can receive an addition of silicate of soda, if desirable or necessary.

What I claim is:—

1. The process of making exchange silicates which comprises extracting a rocky material containing acid-soluble silicates with an acid, neutralizing the acid solution to produce a precipitate, and drying said precipitate at a low temperature.

2. The process of making exchange silicates which comprises extracting a rocky material containing acid-soluble silicates with an acid, further extracting said material with an alkaline solution, neutralizing the acid solution with said alkaline solution to produce a precipitate and drying said precipitate at a low temperature.

3. The process of making exchange silicates which comprises extracting a rocky material containing acid-soluble silicates with hydrochloric acid, neutralizing the acid solution to produce a precipitate, and drying said precipitate at a low temperature.

4. The process of making exchange silicates which comprises extracting a rocky material containing acid soluble silicates with hydrochloric acid, further extracting said material with a soda solution, neutralizing the acid solution with said soda solution to produce a precipitate and drying said precipitate at a low temperature.

In testimony whereof, I affix my signature.

G. RUDORF.